Aug. 31, 1965 D. L. PREVITE 3,203,578
CLOSURE DEVICE
Filed Feb. 28, 1962 2 Sheets-Sheet 1

INVENTOR
Dominick L. Previte

BY  *Feagno & Stover*

ATTORNEYS

Aug. 31, 1965  D. L. PREVITE  3,203,578
CLOSURE DEVICE
Filed Feb. 28, 1962  2 Sheets-Sheet 2
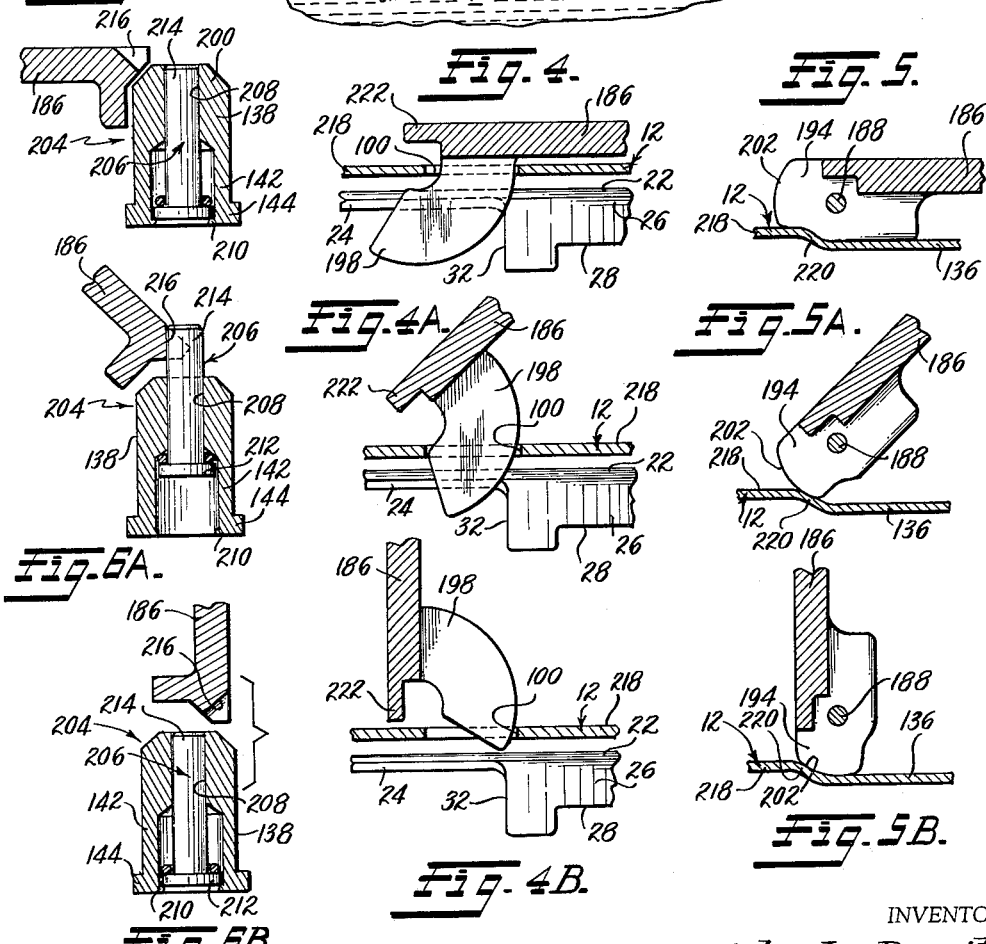
INVENTOR
Dominick L. Previte
BY
ATTORNEYS

United States Patent Office 3,203,578
Patented Aug. 31, 1965

3,203,578
CLOSURE DEVICE
Dominick L. Previte, Willowick, Ohio, assignor to Eaton Manufacturing Company, Cleveland, Ohio, a corporation of Ohio
Filed Feb. 28, 1962, Ser. No. 176,265
8 Claims. (Cl. 220—44)

This invention relates to closure devices for pressurized containers and more particularly to improved structure for releasably retaining a closure device on a container wherein the structure includes apparatus for maintaining the structure in a securing position until pressure is relieved from the container at which time the structure may be repositioned to enable the closure device to be removed from the container.

It has long been desired to provide closure devices for pressurized containers with structure which will prevent the closure devices from being removed from the pressurized container until after the pressure within the container has been relieved therefrom.

Various arrangements have heretofore been employed in many installations and assemblies to create different types of locking, safety and securing structures for pressure relief closure devices employed to close an opening in a pressurized container but in each of the known types of structures there has not been employed apparatus which is responsive to the relief of such pressure from within the container which maintains the closure device in a locked or secured position on the container by restraining the locking or safety structure against movement from the securing position thereof to a releasing position with the apparatus being responsive to the relief of such pressure to enable the safety or locking structure to move to the releasing position whereat the closure device may then be removed from the container after such pressure has been relieved therefrom.

In installations, such as a pressurized water-cooled engine cooling system employing a radiator, there is usually and normally provided a pressure relief closure device in the form of a pressure relief radiator cap which is removably secured to an opening in a filler neck portion of the radiator, and it is desirable that the closure device in this type of installation be provided with a safety feature which prevents the closure device from being removed from the filler neck portion of the radiator until after the pressure of the fluid contained within the radiator has been released therefrom.

Accordingly, it is an object of this invention to provide a closure device for a pressurized container with structure for removably securing the closure device to the container with the structure including apparatus which is responsive to the relief of pressure from the container to maintain the structure in a position wherein the closure device is secured to the container until the pressure therein is relieved therefrom and then permitting the structure to be repositioned to enable the closure device to be removed from the container.

It is also an object of this invention to provide structure for a closure device which may be employed to close an opening in a pressurized container wherein the structure includes apparatus for maintaining the structure in a closure device securing position until the pressure within the container is relieved at which time the apparatus then permits the structure to be moved to a closure device removing position on relief of such pressure to enable the closure device to be removed from the container.

A further object of this invention is to provide apparatus for structure which is employed to secure a closure device to an opening in a pressurized container wherein the apparatus is responsive to the relief of pressure from the container to restrain and maintain the structure in a closure device securing position with the apparatus being further responsive to the relief of such pressure to permit the structure to be moved to a closure device removing position whereat the closure device may be removed from the container only after the fluid pressure has been relieved therefrom.

An additional object of this invention is to provide a closure device for a pressurized container with a safety feature which assuures that the pressure of the fluid within the container will be relieved from the container before the closure device may be removed therefrom.

Another additional object of this invention is to provide a closure device for a pressurized container with a safety feature which protects a user, when in the process of removing the closure device from the pressurized container, from any harm which might be caused as a result of a premature release of the pressure from the container.

Still yet another additional object of this invention is to provide a closure device for a pressurized container, such as a radiator of a pressurized water-cooled engine cooling system, with a safety feature which prevents the user from removing the closure device from the radiator until after the fluid pressure therein has been relieved therefrom so that the user will be protected from harm such as scalding or burning which might be caused by a premature relief of fluid pressure toward the user's hand while the user is in the process of removing the closure device from the radiator.

In order to overcome the disadvantages and accomplish the results, both stated above, this invention provides a closure device which is effective in closing an opening in a pressurized container with structure in the form of a pivotally mounted elongate element that is movable between a first position wherein a part of the element is in engagement with the container in a manner which secures the closure device to the container and a second position wherein the part of the element is disengaged from the container so that the closure device may be removed therefrom. As in conventional practices the closure device is provided with a valving assembly which normally creates a seal between the opening in the container and the closure device and a linkage arrangement or structure is provided which interconnects the element of the structure with the valving assembly so that on initial movement of the element from the first position toward the second position thereof the seal between the valving assembly and the opening of the container is broken to relieve pressure from the container. The closure device is further provided with apparatus which is responsive to the relief of the pressure from the container to restrain and prevent the element from further moving from the first position to the second position with the apparatus maintaining the element in a position which is intermediate the first and second positions thereof until after the pressure is relieved from within the container with the apparatus being responsive to the relief of the pressure to permit the element to be further moved toward the second position so that the element may be moved to the second position whereat the closure device may then be removed from the container.

Other objects and important features of the invention will be apparent from a study of the specification following which taken with the drawing, together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 3 is an elevational sectional view taken along the line 3—3 of FIGURE 2 looking in the direction of the arrows;

FIGURE 4 is an end elevational sectional view taken along line 4—4 in FIGURE 2 looking in the direction of the arrows and illustrating the securing structure in a first position wherein the closure device is secured to the container;

FIGURES 4A and 4B are views similar to FIGURE 4 but illustrating the securing structure as being in an intermediate position and a second position, respectively, with the closure device being removable from the container when the securing structure is in the second position as illustrated in FIGURE 4B;

FIGURE 5 is an end elevational sectional view taken along the line 5—5 of FIGURE 2 looking in the direction of the arrows and illustrating an arrangement for mounting the securing structure to enable the securing structure to break a seal between the closure device and the container;

FIGURES 5A and 5B are similar to FIGURE 5 and correspond to FIGURES 4A and 4B and illustrate the arrangement as the securing structure is in the intermediate position and the second position respectively;

Figure 2:
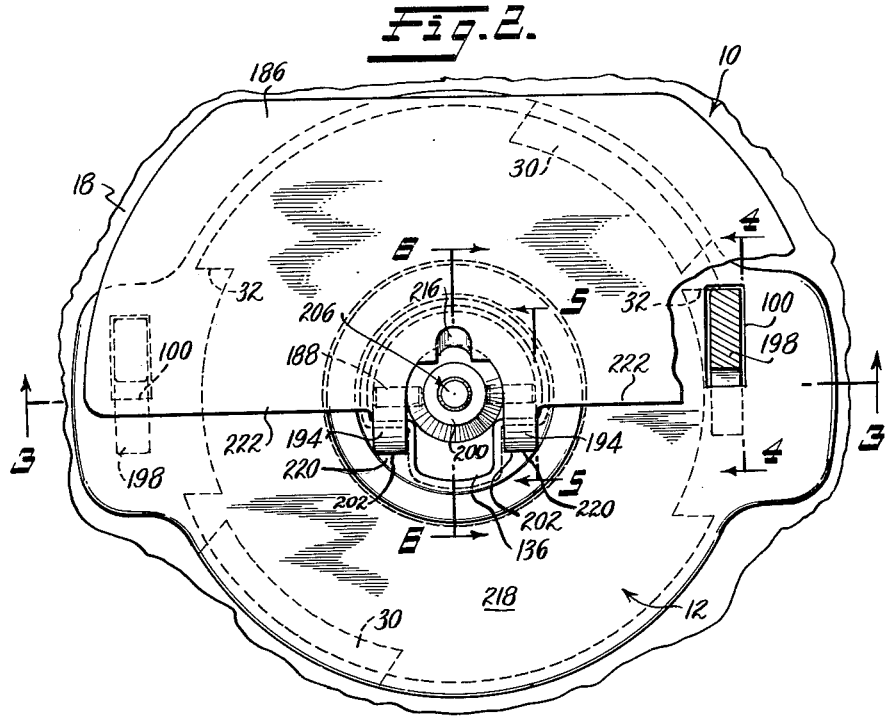
FIGURE 2 is a plan view of the closure device illustrated in FIGURE 1 of the drawing.

FIGURE 6 is an end elevational sectional view taken along the line 6—6 of FIGURE 2 looking in the direction of the arrows and illustrating apparatus which is responsive to the relief of pressure from the container to restrain movement of the securing structure from the first position to the second position; and FIGURES 6A and 6B are similar to FIGURE 6 and correspond to FIGURES 4A, 5A and 4B, 5B and illustrate the apparatus in operational relationship relative to the securing structure when the securing structure is in the intermediate position and second position respectively.

Figure 1:
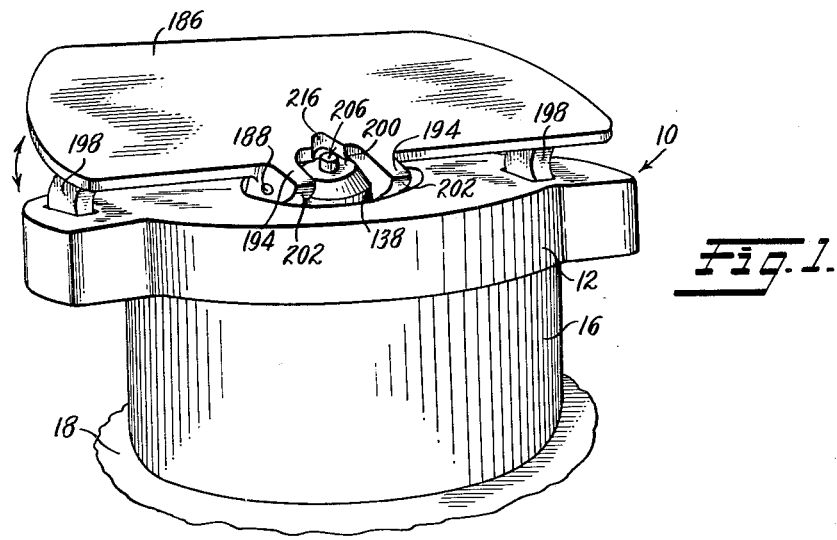
FIGURE 1 is an isometric view of a closure device having improved securing structure and apparatus of the invention incorporated therein with the closure device being illustrated as closing an opening in a pressurized container.

Attention is now directed to FIGURES 1, 2 and 3 of the drawing wherein there is shown a closure device 10, of the pressure relief type, and which, as illustrated, may be preferably in the form of a radiator cap for positioning over an opening 14 formed by a filler neck portion 16 extending from a container 18, partially shown and illustrated in the preferable form as a part of a radiator.

For the sake of brevity the various details of certain elements, structures, features, etc., of this invention will not be described and disclosed herein and reference may be taken to co-pending application for United States Letters Patent, S.N. 171,720, filed February 7, 1962, for Closure Device, wherein there is described, disclosed, illustrated and shown in particular detail the certain elements, structures, features, etc., which may be considered as being substantially common to the inventions, such as, for example, the details of the closure device 10, i.e., cover shell or housing 12, fluid pressure and fluid flow restraining valving assembly 46, chamber 52, vacuum relief valving assembly 62, diaphragm member 74, coil spring 76, openings 100 in the periphery of the cover shell or housing 12 and inturned flanges 30 formed on the inner rim of the cover shell or housing 12; and the details of the container 18, i.e., seat 22, rim 26 and edge 28 portions of the filler neck portion 16 as well as openings 24 and stops 32 which are defined thereby, and valve seat or shoulder 60. It is to be recognized, although not fully disclosed herein, that a conventional bayonet securing relation is provided between the cover shell or housing 12 and the container 18 through the inner engagement of the flanges 30 of the cover shell or housing 12 and the edge portion 28 of the filler neck portion 16.

An opening 134 is provided in a centrally disposed recessed portion 136 of the cover shell or housing 12 of the closure device 10 through which there extends a linkage structure or arrangement 138 preferably in the form of an elongate longitudinally movably mounted link or pin having one end portion 142 disposed within the chamber 52 of the valve assembly 46 with the other end portion 200 thereof projecting beyond the cover shell or housing 12. The link or pin arrangement 138 may be restrained, if desired, for the purpose of assembly, by any suitable means, against rotation relative to the cover shell or housing 12 and the one end portion 142 of the arrangement 138 is enlarged and provided with a shoulder 144 operably associated, by suitable biasing structure 184, with the valving assembly 46 and longitudinal movement of the link or pin arrangement 138, as will be described and disclosed in more detail hereafter, is effective to break the seal created by the valving assembly 46 and the seat 60 between the closure device 10 and the container 18 which will enable fluid pressure of a fluid F which is confined within the container 18 to be relieved or released to atmosphere since the seal which is normally created between the valving assembly 46 and the seat 60 functions to seal the fluid pressure of the fluid F within the container 18 from atmosphere and from preventing communication of the fluid F in the container 18 within the filler neck portion 16 or an overflow conduit, not illustrated, which may be provided therein.

Releasable securing structure is provided for securing the closure device 10 to the container 18 and to release the closure device 10 for removal from the container 18 after the pressure of the fluid F which is contained therein has been relieved therefrom and attention is now directed to FIGS. 4, 4A and 4B of the drawing wherein the operation of the releasable securing structure is illustrated.

In the preferred embodiment or modification of the invention, the securing structure includes an elongate substantially flat element 186 of generally planar configuration which extends diametrically across the cover shell or housing 12 and which is carried by and mounted on the closure device 10 by suitable means such as a pivot mount arrangement in the form of pivot pins 188 which pivotally connect the element 186 to the one end portion 200 of the linkage arrangement 138 with the element 186 being movable, as illustrated by the arrow in FIGURE 1 of the drawing, between a first position wherein the closure device 10 is secured to the container 18 and a second position wherein the closure device 10 may be removed from the container 18 only after the fluid pressure of the fluid F contained therein has been relieved, as will be described, disclosed and explained in more detail hereinafter.

In substantially diametrically opposed laterally spaced relationship adjacent the peripheral edge portion of the element 186 there is provided depending lug-like parts 198 which pass through the openings 100 in the cover shell or housing 12 which are disposed adjacent thereto and in aligned relationship therewith. One of the lug-like parts 198 also passes through one of the openings 24 on the rim portion 26 of the filler neck portion 16 of the container 18 whereat the one lug-like part 198 is disposed in engagement with the one end extremity of the opening 24 adjacent the stop portion 32 provided in the edge portion 28 of the filler neck portion 16 when the element 186 is in the first position and disposed in substantially parallel relationship to the cover shell or housing 12, note FIGURE 4 of the drawing, which will prevent the removal of the closure device 10 from the container 18.

As illustrated in FIGURE 4B of the drawing, when the element 186 is disposed in the second position which enables the closure device 10 to be removable from the container 18 the element 186 will be disposed in a plane which is substantially normal to the cover shell or housing 12 with the one lug-like part 198 being removed from the respective opening 24 and out of engagement with the respective stop portion 32 defined by the edge portion 28 of the filler neck portion 16.

In addition to the securing structure described and disclosed above, pressure relief structure as illustrated in FIGS. 5, 5A and 5B of the drawing is provided for effectively relieving the pressure of the fluid F within the container 18 after the initial movement of the element 186 from the first position as illustrated in FIGS. 4 and 5 to an intermediate position as illustrated in FIGS. 4A and 5A of the drawing, has taken place and prior to the final movement of the element 186 to the second position as illustrated in FIGS. 4B and 5B of the drawing.

The pressure relief structure is effective to break the seal between the valving assembly 46 and the seat 60 on the initial movement of the element 186 from the first position to the intermediate position and the pressure relief structure in the preferred embodiment or modification of the invention includes a cam-like yoke-shaped part 194 which defines cam surfaces 202 which engage a shelf portion 218 that encircles the recessed portion 136 of the cover shell or housing 12, as illustrated in FIGS. 5, 5A and 5B of the drawing, and on pivotal movement of the element 186 from the first position, note FIGURE 5, to the intermediate position, as illustrated in FIGURE 5A, the cam surfaces 202 react against the shelf portion 218 which encircles the recessed portion 136 of the cover shell or housing 12 and an embossment 220 defined by the juncture between the shelf portion 218 and the recessed portion 136 to effectively urge the linkage arrangement 138, as indicated by the arrow in FIGURE 3 of the drawing, upwardly which in turn breaks the seal of the valving assembly 46 and the seat 60 to enable fluid pressure of the fluid F within the container 18 to be released to atmosphere through a conventional type of venting conduit, not illustrated.

At this time attention is directed to FIGURES 6, 6A and 6B of the drawing wherein there is illustrated apparatus 204 which is effective to maintain the element 186 in the intermediate position, as illustrated in FIGURES 4A, 5A and 6A of the drawing and restrain further movement of the element 186 toward the second position, as illustrated in FIGURES 4B, 5B and 6B of the drawing until after the pressure of the fluid F within the container 18 has been relieved.

The apparatus 204 includes an elongate pin-like member 206 longitudinally movable within the confines of a bor or groove 208 which extends longitudinally through the full extent of the linkage arrangement 138. The pin-like member 206 is maintained within the confines of the bore or groove 208 which extends longitudinally through which projects laterally into the bore or groove 208 with the pin-like member 206 being normally disposed thereagainst through the force of gravity acting thereon, note FIGURE 6 of the drawing.

The pin-like member 206 is provided with an elongate piston-type end portion 212 which normally rests against the projection 210 with the other end portion 214 of the pin-like member being disposed substantially flush with the adjacent portions of the linkage assembly 138 when the element 186 is in the first position, as illustrated in FIGURE 6 of the drawing.

On movement of the element 186 from the first position, as illustrated in FIGURE 6, to the intermediate position, as illustrated in FIGURE 6A, and with the relief of the pressure of the fluid F from the container 18, as explained above, the pressure force will act against the piston type end portion 212 of the pin-like member 206 to overcome the force due to gravity which is acting thereon, and the relieved fluid pressure force will urge the pin-like member 206 upwardly, as shown by the arrow in FIGURE 3 of the drawing, to the position thereof, as illustrated in FIGURE 6A which is the intermediate position of the element 186 and corresponding to FIGURES 4A and 5A, whereat the other end portion 214 of the pin-like member 206 will be received and positioned in a notch, recess or slot 216 provided in the intermediate portion of the element 186 between the cam-like yoke-shaped part 194 to restrain the element 186 against further movement of the element 186 toward the second position as illustrated in FIGURES 4B, 5B and 6B of the drawing until the pressure of the fluid F within the container 18 has been relieved to atmosphere. At this time, with the pin-like member 206 being in engagement with the element 186 with the other end portion 214 being disposed and received within the notch, recess or slot 216 the element 186 will be naturally slightly backed off from the second position and held, maintained or retained in the intermediate position as illustrated in FIGURES 4A, 5A and 6A of the drawing by reason of the co-action between the embossment 220 and the cam-like yoke-shaped 194 of the element 186 with such co-action creating a bias which prevents the element 186 from being returned to the first position. With the element 186 being disposed in the intermediate position as described above with the other end portion 214 of the pin-like member 206 being free of the notch, recess or slot 216 but disposed in the position as illustrated in FIGURE 6A whereat the pin-like member 206 will prevent movement of the element 186 to the second position the pin-like member 206 will be free to return, due to the influence of gravitational force thereon, to the second position thereof as shown in FIGURE 6B whereat the pressure of the fluid has been relieved from within the container 18 at which time the pin-like member 206 will return to the second position thereof with the other end portion 214 being removed from the notch, slot or recess 216 in the element 186 due to the force of gravity acting thereon and the element 186 may then be moved to the second position whereat the closure structure 10 may be easily removed from the container 18 since the one lug-like part 198 is no longer in engagement with the respective stop portions 32 of the filler neck portion 16 of the container 18, as shown by FIGURE 4B of the drawing.

The longitudinally extending edge portions of the element 186, which are intermediate the cam-like yoke-shaped part 194 and the respective depending lug-like parts 198, each define an abutment 222 for engagement with the shelf portion 218 of the cover shell or housing 12, as shown in FIGURE 4B of the drawing when the element 186 is in the second position with the cam surface 202 of the yoke-shaped part 194 engaging the embossment 220 defined between the shelf portion 218 and the recessed portion 136 of the cover shell or housing 12 in a manner which maintains positions and restrains further movement of the element 186 beyond the second position.

It is also to be noted that the depending lug-like parts 198 of the element 186 by the engagement thereof through the respective openings 100 in the cover shell or housing 12 when the element 186 is in the second or closure device removing position, as illustrated in FIGURE 4B of the drawing, define a bearing engagement therewith to relieve the strain or stress which would normally be placed solely on the pins 188 of the pivot mount arrangement as the closure device 10 is being rotated in the removal thereof from the container 18.

In operation, assuming the closure device 10 to be secured on the container 18, as illustrated in FIGURES 1, 2 and 3 of the drawing by bayonet placement and clockwise rotation of the cover shell or housing 12 relative to the filler neck portion 16 to the position shown in FIGURES 2 and 3 of the drawing with the securing structure having the one lug-like part 198 of the element 186 passing through the respective opening 100 in the cover shell or housing 12, the opening 24 and in engagement with one end extremity of the opening 24 adjacent the stop portion 32 of the rim portion 26 of the filler neck portion 16 of the container 18, as illustrated in FIGURE 4 of the drawing; the pressure relief structure having the cam-like yoke-shaped port 194 of the element 186 in engagement with the shelf portion 218 which encircles the recessed portion 136 of the cover shell or housing 12 which is adjacent thereto, as illustrated in FIGURE 5 of the drawing; and the apparatus 204 having the pin-like member 206, due to the force of gravity acting thereon, positioned as illustrated in FIGURE 6 of the drawing; it is merely necessary for a user to grasp the element 186 and pivot same as shown by the arrow in FIGURE 1 of the drawing from the substantially horizontally disposed first position as illustrated in FIGURES 1, 2, 3, 4, 5 and 6 wherein the element 186 is substantially parallel to the cover shell or housing 12 toward the second position as illustrated in FIGURES 4B, 5B and 6B wherein the element 186 is disposed substantially normal to the cover shell or housing 12.

On initial movement of the element 186 from the first position to the intermediate position thereof, as illustrated in FIGURES 4A, 5A and 6A, the cam surface 202 of the yoke-shaped part 194 of the element 186 is effective to cause the linkage arrangement 138 to break the seal between the valving assembly 46 and the valve seat 60 and release fluid pressure from within the container 18, with the release of the fluid pressure therefrom being in turn effective instantaneously to urge the pin-like member 206 of the apparatus 204 toward the element 186 whereat the other end portion 214 of the pin-like member 206 engages and is received within the recess, slot or notch 216 in the element 186 as illustrated in FIGURE 6A to restrain the element 186 from being movable further toward the second position thereof and restrained in the intermediate position by the co-action of the cam surface 202 with the embossment 220, as illustrated in FIGURE 5A of the drawing, and the pin-like member 206 free to return to the second position thereof as illustrated in FIGURE 6B on relief of the fluid pressure and with the one lug-like part 198 of the securing structure still being in engagement with the stop portion 32 of the rim portion 26 of the filler neck portion 16 of the container 18 as illustrated in FIGURE 4A of the drawing with the cam surface 202 of the cam-like yoke-shaped part 194 of the element 186 being effective to maintain the seal between the valving assembly 46 and the valve seat 60 broken.

When pressure of the fluid F within the container 18 has been relieved to atmosphere, the force created by gravity is sufficient to cause the pin-like member 206 of the apparatus 204 to return to the normal position, as illustrated in FIGURE 6B of the drawing, with the other end portion 214 thereof disengaged from within the recess, notch or slot 216 of the element 186 so that the element 186 may then be further urged toward the second position and maintained and restrained from further movement by reason of the engagement of the abutments 222 with the respective adjacent shelf portions 218 of the cover shell or housing 12, with the one lug-like part 198 of the securing structure being disengaged from the respective stop portion 32 of the rim portion 26 of the filler neck portion 16 of the container 18 and free from the opening 24 therein but still within the confines of the respective opening 100 in the cover shell or housing 12 and in engagement therewith, as illustrated in FIGURE 4B of the drawing, to facilitate along with the other lug-like part 198 in the rotation of the closure device 10 to remove same from the conventional bayonet securement on the container 18 with the cam surface 202 on the edge portion of the yoke-shaped part 194 of the element 186 maintaining the element 186 in the second position, as illustrated in FIGURE 5B of the drawing.

To place the closure device 10 over the opening 14 in the filler neck portion 16 of the container 18 it is merely necessary to substantially reverse the procedure immediately described and disclosed above relating to the manner in which the closure device 10 is effectively removed from the container 18.

While the invention has been described, disclosed, illustrated and shown in terms of an embodiment or modification which it has assumed in practice, the scope of the invention should not be deemed to be limited by the precise embodiment or modification herein disclosed and illustrated; such other embodiment and modification being intended to be reserved especially as they fall within the scope of the claims here appended.

I claim as my invention:

1. A closure device for closing an opening in a pressurized container,
    said device having a housing for covering the opening in such container and valving assembly for creating a seal between the closure device and such container,
    said housing having an opening provided in the central portion and a plurality of openings disposed in spaced relationship relative to each other adjacent the peripheral portion thereof,
    structure for removably securing the closure device to such container including an elongate element disposed adjacent the housing and extending generally thereacross,
    said element having a depending part disposed adjacent each end portion thereof in alignment with the peripheral openings in the housing,
    linking structure provided with a recess extending therethrough,
    said linking structure being disposed in the central opening of the housing and extending therethrough to pivotally interconnect an intermediate portion of the element to the valving assembly to enable the element to be movable between a first position wherein one of said depending parts passes through the respective peripheral opening in the housing and engages such container to effectively secure the closure device thereon and a second position wherein said one depending part of the element is disengaged from such container with the depending parts each being within the respective peripheral openings in the housing and in engagement therewith to facilitate in removing the closure device from the container,
    said intermediate portion of the element having a cam surface effective to actuate said linking structure and break the seal between the valving assembly and such container on initial movement of the element from the first position toward the second position to relieve pressure from within such container, and
    apparatus responsive to the relief of such pressure on initial movement of the element from the first position to restrain said element in a position intermediate the first and the second positions with the one depending part thereof being in engagement with such container and preventing the removal of the closure device therefrom until such pressure has been relieved from such container,
    said apparatus including an elongate member movably disposed within the recess of the linking structure and extending therethrough,
    said member being responsive to the relief of such pressure on initial movement of the element from the first position to engage the intermediate portion of the element and prevent further movement thereof toward the second position until after such pressure has been relieved and on relief of such pressure to be disengaged from the intermediate portion of the element and enable the element to be moved toward the second position whereat the closure device may then be removed from such container after such pressure has been relieved therefrom.

2. A closure device for closing an opening in a pressurized container,
    said device having a housing for covering the opening in such container and valving assembly for creating a seal between the closure device and such container, said housing having an opening provided in the central portion and a plurality of openings disposed in spaced relationship relative to each other adjacent the peripheral portion thereof, structure for removably securing the closure device to such container, said structure including an elongate element having a depending part disposed adjacent each end portion thereof in alignment with the peripheral openings in the housing, a linking arrangement having a recess therein, said linking arrangement extending through the central opening of the housing and pivotally interconnecting an intermediate portion of the element to the valving assembly to enable the element to be movable between a first position wherein one of said depending parts passes through the respective peripheral opening in the housing and engages such container to effectively secure the closure device thereon and a second position wherein said one depending part of the element is disengaged from such container with the depending parts each being within the respective peripheral openings in the housing and in engagement therewith to facilitate in removing the closure device from such container, means effective to actuate said linking arrangement and break the seal between the valving assembly and such container on initial movement of the element from the first position toward the second position to relieve pressure from within such container, and apparatus responsive to the relief of such pressure on initial movement of the element to restrain said element in a position intermediate the first and the second positions with the one depending part thereof being in engagement with such container to prevent the removal of the closure device therefrom until such pressure has been relieved, said apparatus including an elongate member movably disposed within the recess of the linking arrangement and extending therethrough, said member being responsive to the relief of such pressure on initial movement of the element to engage the intermediate portion of the element and prevent movement thereof toward the second position until after such pressure has been relieved and on relief of such pressure to be disengaged from the intermediate portion of the element and enable the element to be moved toward the second position whereat the closure device may then be removed from such container after such pressure has been relieved therefrom.

3. A closure device for closing an opening in a pressurized container, said device having a valving assembly for creating a seal between the closure device and such container, structure for releasably securing said closure device to such container, said structure including an element and a linking arrangement pivotally interconnecting the element to the valving assembly to enable the element to be movable between a first position wherein the element engages such container to secure the closure device thereon and a second position wherein the element is disengaged from such container to enable the closure device to be removed therefrom, cam means effective to actuate said linking arrangement and break the seal between the valving assembly and such container on initial movement of the element from the first position toward the second position and relieve pressure from within such container, and apparatus responsive to the relief of such pressure on initial movement of the element to restrain said element in a position intermediate the first and the second positions with the element being in engagement with such container to prevent the removal of the closure device therefrom until such pressure has been relieved, said apparatus including a member responsive to the relief of such pressure on initial movement of the element to engage the element and prevent movement thereof toward the second position until after such pressure has been relieved and on relief of such pressure to be disengaged from the element and enable the element to be moved to the second position whereat the closure device may then be removed from such container after such pressure has been relieved therefrom.

4. A closure device for closing an opening in a pressurized container, said closure device having a valve assembly means adapted to create a seal between the closure device and said container, structure for releasably securing said closure device to said container, said structure including an element and a linking arrangement interconnecting said element to said valve assembly means to enable said element to be moved between a first position wherein said closure device is secured to said container and a second position wherein said closure device may be removed therefrom, means including said structure effective to actuate said linking arrangement to break said seal between said valve assembly means and said container on initial movement of said element from said first position toward said second position and to relieve pressure from within said container, and restraining means responsive to the release of said pressure on initial movement of said element to restrain said element, intermediate said first and said second positions, against movement thereof toward the second position until after said pressure has been relieved and on relief of said pressure to allow the said element to be moved to said second position whereby the said closure device may then be removed from said container after pressure has been relieved therefrom.

5. A closure device for closing an opening in a pressurized container, said closure device having a valve assembly means adapted to create a seal between the closure device and said container, structure means for releasably securing said closure device to said container, said structure means being movable between a first position wherein the closure device is secured to said container and a second position wherein said closure device may be removed therefrom, means for breaking the seal between said valve assembly means and said container on initial movement of said structure means from said first position toward said second position to affect the relief of pressure within said container, and means responsive to the relief of said pressure on initial movement of said structure means to restrain said structure means, intermediate said first and said second positions, against further movement thereof toward said second position until said pressure within said container has been relieved and on relief of said pressure to enable said structure means to be moved to said second position whereby said closure device may be removed from said container after pressure has been relieved therefrom.

6. Structure means adapted to prevent removal of a closure device from a pressurized container until only after a substantial portion of the excessive pressure within said container has been relieved therefrom, said structure means including an element mounted for movement between a first position wherein a portion thereof is engageable with said container and operable to maintain said closure device secured thereto and a tertiary position wherein said portion of said element is disengaged from said container and said closure device may be removed therefrom, a valve assembly means operable in response to movement of said element from said first position to a second position to relieve pressure from said container with said portion of said element being in engagement with said container, and apparatus responsive to the relief of said pressure on initial movement of said element to restrain said element in said second position intermediate said first and said tertiary positions with said portion of said element being in engagement with said container to prevent the removal of the closure device from said container until said pressure has been relieved.

7. Fastener means adapted to releasably secure a closure device about the neck of an opening in a pressurized container, said fastener means so constructed and arranged on said closure device for movement between a first position wherein said fastener means engages said container to secure said closure device thereon and a third position wherein said fastener means is disengaged from said container and said closure device may be removed therefrom, said fastener means including a linking arrangement connected to a valve assembly means, said valve assembly means adapted to release pressure from said container in response to the initial movement of said fastener means from said first position to relieve said pressure from said container, and apparatus responsive to the relief of said pressure to interrupt movement of said fastener means from said first position to said third position whereby said fastener means is restrained in a second position until after said pressure has been relieved from said container and said apparatus then permitting said fastener means to be moved toward said third position on relief of said pressure to facilitate removal of said closure device from said container.

8. Fastener means adapted to releasably secure a closure device about an open end of a pressure outlet conduit;

said fastener means is so constructed and aranged on said closure device for movement between a first position wherein said fastener means engages said open end of said pressure outlet conduit to secure the closure device thereon, and a second position wherein said fastener means is disengaged from said open end of said pressure outlet conduit and said closure device may be removed therefrom;

a valve assembly so constructed and arranged to release pressure from said pressure outlet conduit in response to the movement of said fastener means from said first position to a position interjacent said first and second positions;

pressure sensitive means responsive to the relief of such pressure to prevent further movement of said fastener means until such pressure has been relieved and said pressure sensitive means subsequently permitting said fastener means to be movable toward the second position, on relief of said pressure within said pressure outlet pipe to enable said closure device to be removed from said open end of said pressure outlet conduit.

References Cited by the Examiner

UNITED STATES PATENTS

| | | | |
|---|---|---|---|
| 1,361,946 | 12/20 | Whitaker | 220—55.3 |
| 1,652,696 | 12/27 | Beard et al. | |
| 2,968,421 | 1/61 | Eshbaugh | 220—44 |
| 2,990,971 | 7/61 | Enell | 220—44 |
| 3,062,400 | 11/62 | Humbert | 220—44 |
| 3,074,588 | 1/63 | Burdue | 220—44 |

THERON E. CONDON, *Primary Examiner.*

EARLE J. DRUMMOND, GEORGE O. RALSTON, *Examiners.*

UNITED STATES PATENT OFFICE
CERTIFICATE OF CORRECTION

Patent No. 3,203,578 August 31, 196:

Dominick L. Previte

It is hereby certified that error appears in the above numbered patent requiring correction and that the said Letters Patent should read as corrected below.

Column 2, line 10, for "assuures" read -- assures --; column 5, line 48, for "bor" read -- bore --; line 51, for "which extends longitudinally through" read -- by reason of detent-like means 210 --; column 6, line 16, after "yoke-shaped" insert -- part --; line 28, after "fluid" insert -- F --; same column 6, line 74, for "port" read -- part --; column 12, line 6, for "aranged" read -- arranged --.

Signed and sealed this 12th day of July 1966.

(SEAL)
Attest:

ERNEST W. SWIDER
Attesting Officer

EDWARD J. BRENNE
Commissioner of Patents